UNITED STATES PATENT OFFICE.

LUDWIG MAES, OF BONN, GERMANY, ASSIGNOR TO KÜPPER'S METALLWERKE GESELL-SCHAFT MIT BESCHRÄNKTER HAFTUNG, OF BONN, GERMANY.

SOLDERING-STICK.

1,078,791.  Specification of Letters Patent.  Patented Nov. 18, 1913.

No Drawing.   Application filed February 2, 1907.  Serial No. 355,502.

*To all whom it may concern:*

Be it known that I, LUDWIG MAES, a subject of the King of Prussia, residing at 68 Bornheimerstrasse, Bonn-on-the-Rhine, Germany, have invented certain new and useful Improvements in Soldering-Sticks; and I do hereby declare the following to be a full, clear, and exact description of the invention, such as will enable others skilled in the art to which it appertains to make and use the same.

The present invention relates to a soldering stick of that kind in which finely divided soft solder as well as soldering fluxes or media are inclosed in a casing.

Soldering sticks ordinarily consist of a more or less hardened mass composed of wax, resin, sal-ammoniac, etc., with particles of tin-solder embedded therein, which is wrapped up in tinfoil or paper, or consist of a tube of soft-solder or a sheet of tinfoil which is filled with a mixture of fat, wax or the like and soldering fluxes or media, such as chlorid of zinc for example or which sticks have been made of a tube of solder filled with granular solder mixed with rosin. Both have the defect that the flux is present in excess and is melted with a slight amount of heat. Consequently soldering sticks of the former kind lose their cohesion in the heat required for soldering, and large pieces of the same, or, say, a part of the particles of tin fall off in an unmelted state. With relatively slight heating the filling flows out from the soldering sticks of the second kind and a metal tube remains behind, with which it is of course not possible to solder as the flux is wanting. These defects however are not only avoided by means of the soldering stick made in accordance with the present invention, but a large number of other advantages are obtained. For example strips or wires which are hidden in telephones may be soldered in the simplest manner without any fear that undesired connections, short circuits, etc., are formed by solder which drops down. Further the present soldering stick is particularly suitable for soldering armature wires into the segments of commutators, for the zinc formers of magnet coils and the like, and at places where large quantities of solder are necessary for the union. This will be less perfectly attainable with a mass of soft solder applied like paint, because the liquid which is present in it must be heated a longer time in order to vaporize it, although such a mass which may be distributed in place for example by a brush, has in itself considerable advantages.

The new technical effect of the present rod or stick is obtained by soft solder material consisting of finely divided (dust-like) soft solder of any desired composition being intimately mixed with a vehicle, for example glycerin, resin-oil, saponified resin, etc., with or without sal-ammoniac or other de-oxidizing agent or flux, and putting this mixture into a casing of soft solder, as is more particularly explained hereafter. The soldering metal or metallic alloy which is contained in the filling requires to be heated for a shorter time in order to melt it, since it is in a finely divided and more or less dust-like state. The melting point of this soldering metal or alloy may be different from that of the casing. The reason of this is that, when soldering, the casing very quickly conducts away the heat which is supplied, and therefore continuously requires fresh quantities of heat. The matter is otherwise with the filling: the particles of metal are surrounded by the other constituents which act as insulators of heat. The total quantity of heat which is supplied is employed in melting the heated part of the filling, whereas the casing conducts away a great part of the heat which it receives.

Good results are obtained, for example, when the casing consists of an alloy of 50 parts tin and 50 parts lead, and when the soft solder which is contained in the filling consists of 67 parts tin and 33 parts lead, or vice-versa; naturally these relative quantities may be varied, and also these alloys may be composed alike and may also consist of other metals that may be used like lead and tin in soft solder. The soldering metal which is to be employed for the filling is preferably used in the condition of fine dust, the same being, for example, intimately ground to a paste with concentrated chlorid of zinc solution and cellulose or other agglutinant, in which also an addition of sal-ammoniac may be employed.

The manufacture of the soldering stick is preferably effected by the tube of metal or alloy being simply filled with the readymade paste-like soft solder material by pressure, suction or the like. The tubes may be filled when their manufacture takes place.

In practice a serviceable proportion has been found when the strength of the casing is chosen in proportion to its contents so that there is one part by volume of the inclosed soft solder material to 2 to 4 parts by volume of the metallic casing. Of course these proportions may be still further varied.

If the new soldering stick is heated, for example with a soldering lamp, spirit flame or the like, a small part of the soft solder material which forms the filling and which also contains the flux is first melted. This has a purifying effect on the place to be soldered and prevents the oxidization of the metal when soldering. The liquid solder from the filling which has melted together alloys with the metal of the casing which is now also melted. In the same degree as the casing melts, the filling enables the process of soldering to be carried out in the manner just described. As soon as the soldering stick is no longer under the action of the heat, the soldering metal of the casing and filling which is still situated on the rod becomes stiff, whereby the filling is prevented from flowing out any more, because the molten metal of the same effects the melting of the casing in consequence of better conduction of heat. For this reason the opening closes easily as soon as the source of heat is removed or the heating action ceases. It is thus in one's power to apply only just as much solder as required.

The present soldering stick thus possesses the advantages of a mass of soft solder which can be applied like a paint e. g. by brush without possessing the disadvantages which are attached to a greater or smaller extent, to such and to known soldering sticks.

From the foregoing it will be seen that the fillings comprise comminuted soft solder and fluxes or de-oxidizing agents, as sal-ammoniac, zinc chlorid, or other materials having a de-oxidizing or reducing action.

In combining the comminuted soft solder metal with the de-oxidizing agent or agents it is sometimes necessary or advisable to use a liquid and the resulting mixture will be too thin for practical purposes; consequently, to bring this mixture to a proper pasty consistency it is necessary to add a vehicle or mixtures thereof which may be or may contain an agglutinant. I use whatever ingredients are suitable for the purpose, the aim being to obtain a filling of such pasty consistency that the comminuted metal will not settle out.

What I claim as my invention and desire to secure by Letters Patent is:

1. A soldering stick consisting of a casing of soft solder with a filling of a paste-like soft solder material which contains metallic soft solder in a finely divided state, said filling combining with the casing to close the casing and confine the filling upon removal of the soldering heat.

2. A soldering stick consisting of a casing of soft solder with a filling of a paste-like soft solder material which in itself is melted more rapidly than the surrounding casing, said filling consisting of dust-like soft solder, a de-oxidizing agent and a vehicle, said filling combining with the casing to close the casing and confine the filling upon removal of the soldering heat.

3. A soldering stick consisting of a casing of soft solder with a filling of a paste-like soft solder material which in itself is melted more rapidly than the casing which surrounds it and consists of dust-like soft solder, a de-oxidizing agent, and an agglutinant, said filling combining with the casing to close the casing and confine the filling upon removal of the soldering heat.

4. A soldering stick having a case composed of soft solder, and a filling of finely comminuted soft solder mixed to a paste with a liquid deoxidizing agent and an agglutinant, said filling combining with the casing to close the casing and confine the filling upon removal of the soldering heat.

5. A soldering stick having a case composed of soft solder and a filling of finely comminuted soft solder mixed to a paste with salammoniac and gylcerin, said filling combining with the casing to close the casing and confine the filling upon removal of the soldering heat.

6. A soldering stick having a tubular case composed of soft solder, and a paste filling containing finely comminuted soft solder and a thickening material, said filling combining with the casing to close said casing and confine the filling upon removal of the soldering heat.

7. A soldering stick composed of a tubular case of soft solder and a filling of comminuted solder mixed to a paste with a de-oxidizing agent and a vehicle, said filling combining with the casing to automatically inclose the filling within the tube upon removal of the soldering heat.

8. A soldering stick comprising a tubular casing of solder and a filling of finely comminuted solder mixed to a paste with a highly deoxidizing agent and a vehicle, the said filling combining with the metal of the casing to automatically seal the end of the casing when the soldering heat is removed, thereby maintaining the casing completely filled with the paste to its sealed end.

9. A soldering stick comprising a tubular casing of solder and a filling of finely comminuted solder mixed to a paste with sal-ammoniac and glycerin, said filling melting together with the metal of the casing at the end of the stick and automatically sealing the casing when the soldering heat is removed, thereby maintaining the casing completely filled with the paste to its sealed end.

10. A soldering stick comprising a tubular casing of solder and a filling of 90 parts of finely comminuted solder mixed to a paste with 10 parts of a solution consisting of a highly deoxidizing mixture, said filling melting together with the metal of the casing at the end of the stick and automatically sealing the casing when the soldering heat is removed, thereby maintaining the casing completely filled with the paste to its sealed end.

11. A soldering stick comprising a tubular casing of solder and a filling of 90 parts of finely comminuted solder mixed to a paste with 10 parts of a solution consisting of sal-ammoniac and glycerin, said filling melting together with the metal of the casing at the end of the stick and automatically sealing the casing when the soldering heat is removed, thereby maintaining the casing completely filled with the paste to its sealed end.

In testimony that I claim the foregoing as my invention, I have signed my name in presence of two subscribing witnesses.

LUDWIG MAES.

Witnesses:
 BESSIE F. DUNLAP,
 LOUIS VANDORY.